United States Patent [19]
Claes et al.

[11] Patent Number: 5,415,436
[45] Date of Patent: * May 16, 1995

[54] HIGH PRESSUURE COUPLING FOR PLASTIC PIPE AND CONDUIT

[75] Inventors: Timothy S. Claes, Findlay; Dean A. Orians, Carey; Stephen W. Switzer, Findlay, all of Ohio

[73] Assignee: Hancor, Inc., Findlay, Ohio

[ * ] Notice: The portion of the term of this patent subsequent to Jul. 5, 2011 has been disclaimed.

[21] Appl. No.: 243,239

[22] Filed: May 16, 1994

Related U.S. Application Data

[63] Continuation-in-part of Ser. No. 962,984, Oct. 16, 1992, Pat. No. 5,326,138.

[51] Int. Cl.⁶ ............................................. F16L 17/03
[52] U.S. Cl. .................................... 285/110; 285/319; 285/423; 285/903; 285/910; 285/921; 285/369
[58] Field of Search ............... 285/903, 319, 308, 317, 285/321, 110, 921, 423, 910, 369; 277/174, 205, 206, 228, 229

[56] References Cited

U.S. PATENT DOCUMENTS

| | | |
|---|---|---|
| D. 235,100 | 5/1975 | Maroschak . |
| D. 235,101 | 5/1975 | Maroschak . |
| D. 235,102 | 5/1975 | Maroschak . |
| D. 235,103 | 5/1975 | Maroschak . |
| D. 235,104 | 5/1975 | Maroschak . |
| 1,049,542 | 1/1913 | Smith . |
| 1,931,922 | 10/1933 | Damsel et al. ................. 285/910 X |
| 2,537,284 | 1/1951 | Schuder . |
| 2,650,114 | 8/1953 | Epstein . |
| 3,167,330 | 1/1965 | Draudt . |
| 3,188,586 | 6/1965 | Martin et al. . |
| 3,239,254 | 3/1966 | Campbell ........................ 285/424 X |
| 3,389,923 | 6/1968 | Love et al. ............................ 285/321 |
| 3,447,819 | 6/1969 | Borsum et al. ................. 285/321 X |

(List continued on next page.)

FOREIGN PATENT DOCUMENTS

| | | | |
|---|---|---|---|
| 275055 | 7/1988 | European Pat. Off. ............ | 285/319 |
| 275749 | 7/1988 | European Pat. Off. ............ | 285/319 |
| 360634 | 3/1990 | European Pat. Off. ............ | 285/921 |
| 3625330 | 8/1987 | Germany ............................ | 285/903 |
| 1260290 | 1/1972 | United Kingdom ................ | 285/110 |

Primary Examiner—Dave W. Arola
Attorney, Agent, or Firm—Fay, Sharpe, Beall, Fagan, Minnich & McKee

[57] ABSTRACT

A length of corrugated tubing is (B) inserted into a bell (C) having an open end 42. The corrugated tubing is defined by alternating annular portions peak (22) and valley portions (24) and a cylindrical inner wall (26) connected with an inner surface of the valley portions. Annular chambers (28) are defined between the cylindrical inner liner and each peak portion. The bell has a stop (10) and a cylindrical side wall (40) with a groove (44) for receiving a gasket (30) that is disposed in one of the tubing valleys. The groove is constructed an integer number of peak and valley portions from the stop such that the gasket aligns with the groove when an end of the tubing length abuts the stop. A plurality of latch elements (60) are disposed an integer number of peak and valley portions from the gasket receiving groove toward the bell open end. The latch elements extend into another of the valley portions and engage a corrugation side wall to transfer axial uncoupling forced from the tubing to the bell side wall. Each latch element is hingedly connected (70) with the bell cylindrical side wall. The latch elements each include a cam surface (64) which engage peak portions of the received tubing length and are cammed radially outward such that the latch elements pivot radially outward to facilitate receipt of the first length of corrugated tubing.

17 Claims, 2 Drawing Sheets

U.S. PATENT DOCUMENTS

| Patent No. | Date | Inventor | Ref |
|---|---|---|---|
| 3,471,179 | 10/1969 | Sixt . | |
| 3,669,473 | 6/1972 | Martin et al. . | |
| 3,695,643 | 10/1972 | Schmunk . | |
| 3,699,684 | 10/1972 | Sixt . | |
| 3,747,352 | 7/1973 | Maroschak . | |
| 3,785,682 | 1/1974 | Schaller et al. . | |
| 3,789,615 | 2/1974 | Maroschak . | |
| 3,792,941 | 2/1974 | Maroschak . | |
| 3,792,942 | 2/1974 | Cole . | |
| 3,799,418 | 3/1974 | Maroschak . | |
| 3,802,202 | 4/1974 | Maroschak . | |
| 3,825,288 | 7/1974 | Maroschak . | |
| 3,831,470 | 8/1974 | Maroschak . | |
| 3,854,527 | 12/1974 | Maroschak . | |
| 3,859,025 | 1/1975 | Maroschak . | |
| 3,861,152 | 1/1975 | Maroschak . | |
| 3,861,153 | 1/1975 | Maroschak . | |
| 3,864,446 | 2/1975 | Maroschak . | |
| 3,877,831 | 4/1975 | Maroschak . | |
| 3,891,733 | 6/1975 | Maroschak . | |
| 3,897,090 | 7/1975 | Maroschak . | |
| 3,899,198 | 8/1975 | Maroschak . | |
| 3,910,713 | 10/1975 | Maroschak . | |
| 3,916,763 | 11/1975 | Maroschak . | |
| 3,919,367 | 11/1975 | Maroschak . | |
| 3,926,222 | 12/1975 | Shroy et al. . | |
| 3,958,719 | 5/1976 | Ward | 285/921 X |
| 3,990,827 | 11/1976 | Maroschak . | |
| 4,003,685 | 1/1977 | Maroschak . | |
| 4,082,327 | 4/1978 | Sting et al. . | |
| 4,247,136 | 1/1981 | Fouss et al. . | |
| 4,286,808 | 9/1981 | Fouss et al. . | |
| 4,368,894 | 1/1983 | Parman | 285/231 X |
| 4,439,130 | 3/1984 | Dickhut et al. . | |
| 4,441,745 | 4/1984 | Nicholas . | |
| 4,480,855 | 11/1984 | Rosenbaum . | |
| 4,487,421 | 12/1984 | Housas et al. | 285/110 X |
| 4,575,133 | 3/1986 | Nattel . | |
| 4,702,502 | 10/1987 | Shade et al. . | |
| 4,711,472 | 12/1987 | Schnell . | |
| 4,913,473 | 4/1990 | Bonnema et al. . | |
| 4,969,670 | 11/1990 | Bonnema et al. . | |
| 5,094,482 | 3/1992 | Petty et al. | 285/903 X |
| 5,163,717 | 11/1992 | Wise | 285/903 |

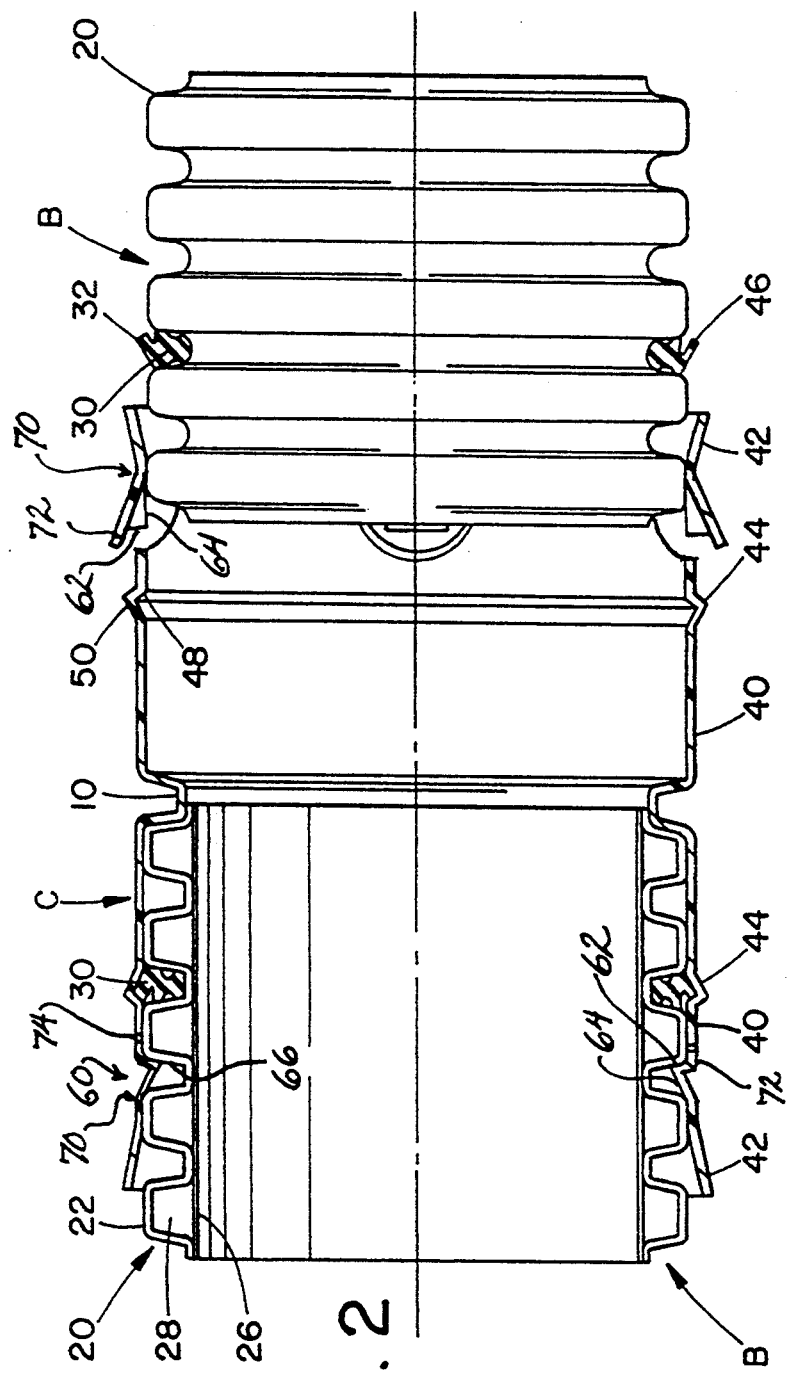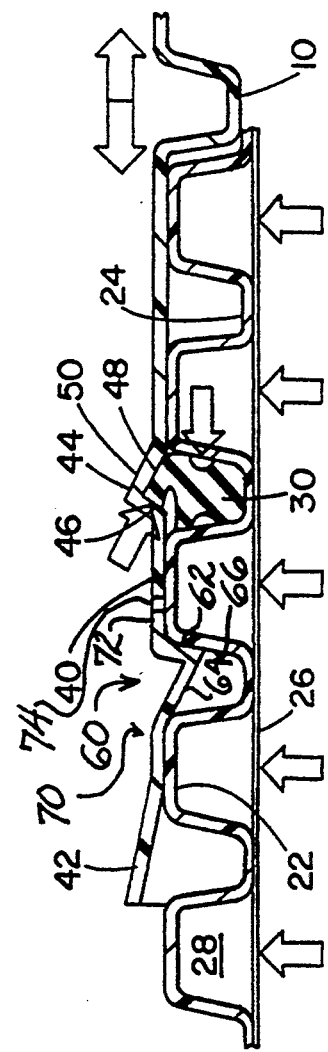
FIG. 2
FIG. 3

HIGH PRESSUURE COUPLING FOR PLASTIC PIPE AND CONDUIT

This application is a continuation-in-part of U.S. patent application Ser. No. 07/962,984 filed Oct. 16, 1992, now U.S. Pat. No. 5,326,138.

BACKGROUND OF THE INVENTION

The present invention relates to the art of connecting tubing, pipes, and conduit. It finds particular application in conjunction with the interconnection of large diameter, smooth interior wall corrugated plastic tubing and will be described with particular reference thereto. However, it is to be appreciated, that the invention will also find application in conjunction with smooth-walled, corrugated, and other types of pipe and tubing.

Large diameter plastic pipe, e.g. 24 inch (60 cm) plastic pipe, is commonly shipped and handled in sections, e.g. 20 foot (6.5 m) sections. Each length has a stiff, self-supporting outer wall which includes alternating peaks and valleys that define a series of corrugations. Optionally, a lighter-weight continuous tubular liner extends along and is connected with the valleys to define a smooth interior diameter. Tubing with a smooth interior diameter has a substantially higher fluid carrying capacity than tubing with a corrugated interior of the same diameter.

To connect the lengths of tubing, external bell couplers are often utilized. The external bell couplers include a plastic sleeve or bell connected to one end of a tubing length. The bell has an inner diameter which substantially matches the outer diameter of the corrugation peaks of the tubing length to be connected. Typically, a stop is defined to provide an abutment for the end of the connected tubing length.

Internal couplers are also used to connect lengths of tubing. Internal couplers include a plastic sleeve whose outer diameter substantially matches the inner diameter of the corrugation valleys of the tubing lengths to be connected. One or more outwardly projecting corrugations are defined in the center of the coupler to mark the center and to provide an abutment for the ends of the connected tubing lengths. Internal couplers are generally used to connect corrugated tubing without internal tubular linings. The internal coupler with cleats could not be readily used in connection with internal tubular liners because the internal tubular liner interferes with the outward projecting cleats. The coupler cleats could not extend into the internal valleys due to the tubular liner.

To provide a fluid tight seal, an annular gasket can be disposed in one of the corrugation valleys which will be received within the coupler. Generally, the tighter the gasket presses against the cylindrical interior surface of the coupler, the more pressure the joint can be expected to hold. As the end of the tubing length is inserted into the coupler (or the coupler inserted around the end of the tubing length), the gasket is compressed into the valley and firmly against the interior cylindrical surface of the bell.

In the past, attempts to improve the seal and raise the failure pressure have focused on the gasket. In particular, the gaskets are now compressed sufficiently that water does not flow between the gasket and bell. To facilitate insertion with this high compression of the gasket, the interior surface of the coupler bell is commonly coated with a lubricant. This facilitates pressing the coupling and the end of the pipe together, typically with axial pressure from a backhoe. Although the gasket/bell interface withstands well over 10 psi, the couplings still fail at about 10 psi.

The inventors herein have discovered an unexpected failure mode. With reference to FIGS. 1A and 1B, the internal pressure in the pipe feeds back around the end of the pipe to the gasket. The gasket acts like a piston in the coupler sleeve. The pressure tries to push the piston or gasket out of the coupler sleeve in a direction which tries to compress the pipe axially. This first axial compressire force is combined with a second force which also urges the pipe to compress axially. The annular chambers defined between the smooth inner liner and the corrugation peaks typically have a very small weep hole to allow the pressure within these annular regions to equalize with the external environment. As the pressure in the interior of the pipe increases, there is an increasing pressure differential between the interior of the pipe and the annular regions below the corrugation peaks. This pressure differential causes the inner liner to arc into the annular regions and the corrugation peaks in the coupler bell to draw together axially or fold in an accordion-type style. Backfill around corrugations outside the coupler tends to fill the corrugation valleys and resist this accordion-type contraction. However, the corrugations adjacent the gasket are shielded from the backfill by the bell. The corrugations on the high pressure side of the gasket are not subject to the first axial compressire force and are only subject to the second compressive force until the pressure equalizes through the weep hole. The corrugations on the low pressure side of the gasket are subject to both pressures.

As these two axial pressures cause the corrugations to contract in an accordion-like manner, the length of tubing section becomes shorter. Because the central region of the tubing section is well anchored by the backfill, the gasket and the end of the tubing move toward the central portion of the tubing section and are withdrawn from the coupler. In a double bell connector, the end of the tubing connected to the other bell withdraws analogously, but in the opposite direction. This axial compression or shortening of the pipe continues until the gasket is pulled from the bell or until the pipe compresses further on one side than the other. Such uneven compression or crushing of the pipe causes a rotation of the gasket out of the vertical plane (when the longitudinal axis of the pipe is horizontal) which also pulls the gasket away from the bell. The lubrication which was used to allow the gasket to seal more completely to the interior surface of the bell actually facilitates the movement of the gasket and failure of the joint. In this manner, the solution dictated by the conventional wisdom discussed above, i.e., compressing the gasket so hard that a lubricant is required for its insertion, is actually promoting the failure.

The present invention contemplates a new and improved coupling arrangement which overcomes the above-referenced problems and others.

SUMMARY OF THE INVENTION

According to one aspect of the present application, a tubing coupling system is provided. The tubing coupling system includes a length of corrugated tubing having a corrugated side wall defined by alternating, annular peak and valley portions and a cylindrical inner wall connected with an inner surface of the valley portions. Annular chambers are defined between the inner liner at each peak portion. A bell is provided having an open end into which the corrugated tubing length is received and a generally cylindrical side wall. The cylindrical side wall has a cylindrical interior surface in which a gasket receiving groove is defined. Latch elements are configured circumferentially around the bell side wall extending radially inward. Each latch element extends into one of the valley portions of the received corrugated tubing length and engages a corrugation side wall to restrain axial movement between the bell and the length of corrugated tubing.

According to another aspect of the present application, each latch element is hingedly connected with the cylindrical wall such that the latch elements pivot radially outward to facilitate receipt of the first length of corrugated tubing.

In accordance with another aspect of the present invention, the bell defines a stop to limit receipt of the corrugated tubing length. The gasket receiving groove is defined on integer number of corrugation peak and valley portions from the stop such that a gasket received in one of the corrugation valleys is received in the groove. The latch elements are disposed on integer number of peak and valley portions from the groove toward the bell open end such that the latch elements are received in another corrugation valley of the tubing length.

One advantage of the present application is that it insures a more reliable coupling between corrugated tubing lengths having a smooth inner tubular liner.

Another advantage of the present application relates to the ease at which the corrugated tubing is inserted into the coupling bell.

Another advantage of the present invention is that it permits water tight and non-water tight connections with the same coupling bell.

Still further advantages of the present invention will become apparent to those of ordinary skill in the art upon a reading and understanding of the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 2 is illustrative of a double bell coupler in combination with two lengths of smooth interior diameter corrugated plastic tubing in accordance with the present invention;

FIG. 3 is a detailed view illustrating interaction of the coupling bell, tubing end, latching elements, and sealing gasket;

DETAILED DESCRIPTION OF THE PREFERRED EMBODIMENTS

Figure 1A:
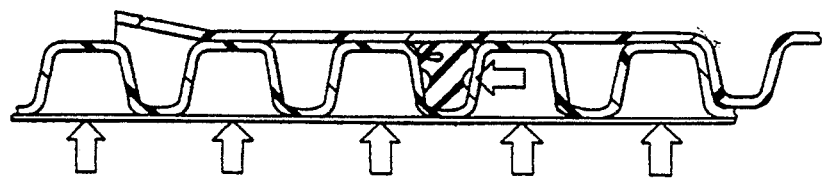
FIGS. 1A and 1B illustrate the newly discovered failure mode of prior art coupling bells.
Figure 1B:
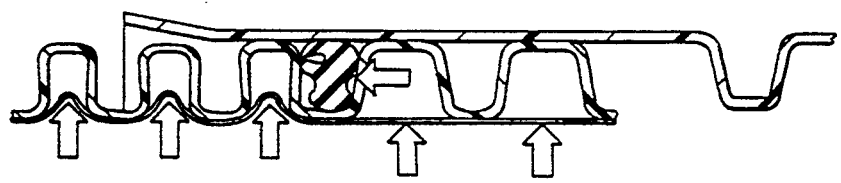

With reference to FIG. 2, a double bell coupler A receives ends of a first and second lengths of corrugated tubing B in opposite facing coupling bells C. The double bell coupler A defines an inward valley or stop 10 annularly around its geometric center. The stop 10 serves to limit the extent of engagement of the tubing ends to assure that each is received to the same, proper depth.

With continuing reference to FIG. 2 and further reference to FIG. 3, each length of corrugated tubing B includes a stiff, strong corrugated outer wall 20 made up of alternating ridge or peak portions 22 and recess or valley portions 24. The corrugated outer wall has sufficient strength to withstand flattening compression from surrounding earth. To provide for higher fluid carrying capacity, a cylindrical inner liner 26 extends along an inner diameter of the corrugation valleys and is integrally connected thereto. The cylindrical liner or wall 26 is lighter weight than the corrugated outer wall but still carries a significant part of the axial load. The inner liner 26 and each of peaks 22 define an annular region 28. Each peak contains a weep hole which allows pressure in the annular regions 28 to come into equilibrium with the external pressure.

For a fluid-tight seal, a gasket 30 is received in one of the corrugation valleys 24 of each corrugated tubing length. The gasket is constructed of a rubber which is readily deformed by pressure. The gasket includes an angled, outward projecting flange or flap 32 which is compressed as the tubing is inserted into the coupler bell C.

Each coupler bell C includes a cylindrical sleeve or wall portion 40 that has an inner diameter which is the same as or slightly larger than the outer diameter of the corrugation peaks 22. The cylindrical sleeve portion 40 has a flared outer end 42 to facilitate receipt of the end of the tubing length and compression of the gasket 30. A force transfer means is provided for transferring an axial uncoupling force on the tubing to the bell such that the axial strength of the bell strengthens the joint. First the axial force transfer means includes an annular groove 44 defined in an inner surface of the cylindrical side wall substantially in alignment with the gasket 30. Most commonly, the tubing sections are cut generally centrally in one of the valleys 24. The gasket is placed a preselected number of corrugations from the end, preferably in the first valley. The gasket flange 32 has a generally flat end wall 46 and the groove has a mating generally flat end wall 48. The relative angle of the end wall 48 is selected such that the gasket end wall 46 abuts it squarely. The axial force is transmitted from the tubing corrugations, through the gasket and gasket flange to the groove flat end wall and the bell cylindrical wall portion.

In the embodiment of FIG. 3, the groove further defines a forward wall 50 which is positioned to limit outward movement of the flange member 32. The groove is defined one corrugation from the stop 10 such that the gasket flange 32 is received therein. As the end of a length of tubing and a coupler are pushed together, generally with a backhoe, the flared end of the coupler A compresses the gasket into valley 24. Continued axial pressure slides the tubing end and the coupler together until the gasket reaches the groove. The gasket expands rapidly or snaps into the groove producing an audible indication that the insertion is complete.

The axial force transfer means further includes a set of cleats or latching elements 60 integrally formed with the coupler bell C and which extend generally, radially inward of the bell cylindrical wall portion 40. The latching elements are spaced around the circumference of the cylindrical wall portion and positioned between the annular groove 44 and the flared end 42. Preferably, four latching elements spaced 90° apart are utilized although a greater or lesser number could also be employed. The equal spacing between the latching elements provides equal retaining forces circumferentially around the coupling bell.

With particular reference to FIGS. 2 and 3, each latching element includes a corrugation engaging wall 62 and a cam surface or tapered wall 64. The engaging wall is disposed generally normal to the cylindrical wall portion 40. The latching elements are spaced an integer number of corrugations from the annular groove 44 such that the engaging wall squarely engages an outer surface 66 of one of the corrugation side walls. The camming wall faces generally towards the bell flared end 42 to engage and be cammed outward by the peak portions 22 as the tubing and coupler are pushed together. Preferably, in operative engagement, the latching elements extend into the second valley from the corrugated tubing end, and act to limit axial movement between the tubing and coupling bell as will be more fully described below.

The plastic of the bell cylindrical wall portion defines a hinge area 70 at the base of the latch element cam surface 64 to allow the latching element to rotate or pivot resiliently outward as the latching elements slide over the peak portions 22 during insertion of the tubing into the coupling bell. A tab or flap 72 is integrally connected to the engaging wall of each latching element extending generally towards the bell stop 10. The tabs or flaps are preferably defined by a semi-circularly shaped cut-out 74 extending from the hinge area around the cleat and back to the hinge area. The configuration of the cut-out 74 may depart from the illustrated semi-circular shape without departing from the inventive aspects of the subject development. For example, rather than a cut-out 74, a thin walled bellow, frangible perforations or the like can be provided to allow outward rotational movement of the latch element. The tab or flap extends from the engaging wall and abuts an adjoining corrugation peak. Under an axial uncoupling force on the tubing, the engagement between the tab 72 and the corrugation peak 22 prevents the cleat from pivoting fully into the valley and cushing.

Figure 4:
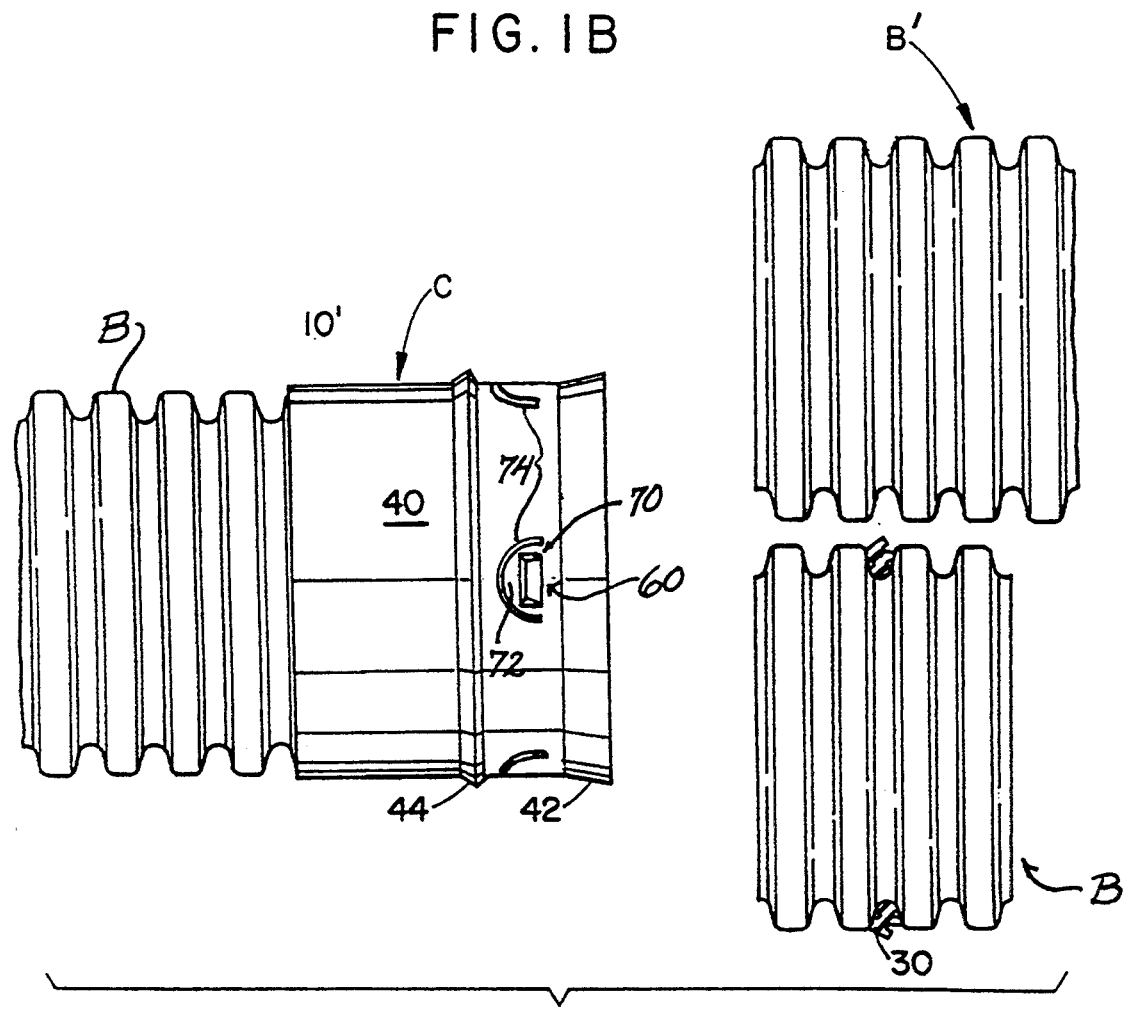
FIG. 4 illustrates the coupling of the present invention as an integral bell coupling on a length of corrugated tubing.

In the embodiment of FIG. 4, the bell C is welded or otherwise permanently affixed to one end of a length of corrugated tubing B or other associated structure. An end of the corrugated tubing B defines the stop surface. The gasket receiving groove 44 and the latch elements 60 are again spaced integer numbers of corrugations from each other and the stop surface.

It will be noted that a secure interconnection is achieved even to tubing B' without the gasket 30. Where an assurity of a fluid tight seal is not needed, the gasket need not be used.

During installation, the first end of the corrugated tubing is inserted into the flared end 42 of the coupling bell C. As the tubing continues to be inserted, the flaps 72 rotate about the hinge region 70 allowing the latching elements 60 to be cammed over peak portions 22 of the corrugated tubing. When the latch elements clear a peak portion, they snap into locking engagement behind it. In this position, the engaging surface 62 squarely engages oppositely facing outer surface of the side wall 66.

An axial tension pulling force applied to either the corrugated tubing length or the coupling bell would urge the joint to uncouple or detach. As described above, the axial force is created by internal tube pressure. When the pressure in the tubing increases, there is an increased pressure differential between the tubing interior and the annular regions 28. As the pressure continues to increase, there is a tendency for the inner liner 26 to buckle into the regions 28 and for the side walls of the corrugation to move together. Backfill tends to fill the corrugation valleys of the central portion of the tubing lengths away from the coupler providing increased resistance to axial compression. Axial compression of the tubing tends to cause the end of one (or both) of the tubing lengths to pull out of the coupler. The insufficient strength relative to axial compression permits the side walls of the corrugations to move together, compressing the corrugations axially and allowing the tubing to contract or shorten in length.

With the present coupler, the axial tension force is transferred through the gasket 30 and the latch element 60 to the coupler. In this manner, the axial extension strength of the coupler is added to the axial compression strength of the corrugated tubing.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A tubing coupling system comprising:
    a length of corrugated tubing having a corrugated side wall defined by alternating, annular peak and valley portions and a smooth flexible inner liner connected with an inner surface of the valley portions to define a smooth, cylindrical interior fluid carrying surface, annular chambers being defined between the inner liner and each peak portion, under internal fluid pressure, the liner is urged into the annular chambers urging the valleys to move toward each other reducing a width of the peaks which urges the corrugated tubing length to shorten which shortening of the corrugated tubing length is resisted by back fill in the valley portions;
    a bell having an open end into which an end of the corrugated tubing length is received and a generally cylindrical side wall with a cylindrical interior surface;
    a gasket received in one of the corrugation valley portions adjacent an end of the corrugated tubing length, the gasket being resiliently biased to project outward beyond an outer diameter of the peak portions and an inner diameter of the bell cylindrical interior surface, the internal fluid pressure pushes fluid around the tubing end and against the gasket causing the gasket to function as a piston urging the corrugated tubing length to contract and urging the tubing end out of the bell, the valleys adjacent the tubing end which are received in the bell being shielded by the bell from receiving backfill which resists shortening; and
    a plurality of latch elements disposed circumferentially around the side wall and extending inward from the cylindrical interior surface, each of the latch elements extending into one of the corrugated tubing valley portions and engaging a side wall thereof for transferring axial uncoupling forces from the first length of corrugated tubing to the bell cylindrical side wall to inhibit the end of the tubing length from pulling out of sealing contact with the coupler bell.

2. The tubing coupling system as set in claim 1 further including:
a stop for limiting receipt of the end of the tubing length of corrugated tubing into the bell, the gasket being received in an integer numbered valley portions from the stop.

3. The tubing coupling system as set forth in claim 2 wherein the latch elements are disposed an integer number of valley portions further from the stop than the gasket such that the latch elements are received in another tubing valley portion.

4. The tubing coupling system as set forth in claim 1 wherein the latch elements are disposed between the bell open end and the gasket.

5. The tubing coupling system as set forth in claim 1 wherein the latch elements are hingedly connected with the cylindrical side walls such that the latch elements are pivotable radially outward when engaged by the tubing peak portions to facilitate receipt of the length of corrugated tubing.

6. The tubing coupling system as set forth in claim 5 wherein the latch elements each include:
a cam surface which engages peak portions of the received length of corrugated tubing and is cammed radially outward thereby; and
a corrugation engaging wall which is received in a corrugation valley portion and engages adjacent peak portion to lock the length of corrugated tubing against withdrawal.

7. The tubing coupling system as set forth in claim 1 wherein each latch element and the bell cylindrical wall are integrally constructed of plastic, the plastic defining a resilient hinge at an interface between the latch element and the bell cylindrical side wall and further including a cut extending from the hinge, around the latch element, and back to the hinge.

8. A tubing coupling system comprising:
a length of corrugated tubing having a corrugated side wall defined by alternating, annular peak and valley portions and a smooth inner liner connected with an inner surface of the valley portions to define a smooth cylindrical interior fluid carrying surface, annular chambers being defined between the inner liner and each peak portion, under internal fluid pressure, the liner is urged into the annular chambers urging the valleys to move toward each other reducing a width of the peaks which urges the corrugated tubing length to shorten which shortening of the corrugated tubing length is resisted by back fill in the valley portions;
a bell having an open end into which the corrugated tubing length is received and a generally cylindrical side wall with a cylindrical interior surface;
a gasket receiving valley portion of the corrugated tubing length receiving a gasket which is resiliently biased to project outward beyond an outer diameter of the peak portions and an inner diameter of the bell cylindrical interior surface, the internal fluid pressure pushes fluid around the tubing end and against the gasket causing the gasket to function as a piston urging the corrugated tubing length to contract and urging the tubing end out of the bell, the valleys adjacent the tubing end which are received in the bell being shielded by the bell from receiving backfill which resists shortening; and
a plurality of latch elements disposed circumferentially around the side wall and extending inward from the cylindrical interior surface, each of the latch elements extending into one of the corrugated tubing valley portions and engaging a side wall thereof for transferring axial uncoupling forces from the first length of corrugated tubing to the bell cylindrical side wall to inhibit the end of the tubing length from pulling out of sealing contact with the coupler bell.

9. The tubing coupling system as set forth in claim 8 further including:
a stop for limiting receipt of the tubing length into the bell; and
a gasket receiving groove defined an integer number of corrugation peak and valley portions from the stop.

10. The tubing coupling system as set forth in claim 9 wherein the latch elements are disposed between the bell open end and the annular gasket receiving groove, and the annular gasket receiving groove is defined in the bell cylindrical wall between the stop and the latch elements.

11. The tubing coupling system as set forth in claim 10 wherein the annular gasket receiving groove is disposed an integer number of corrugations from the stop such that said gasket received in one of the valley portions aligns with the gasket receiving groove when the end of the corrugated tubing length abuts the stop.

12. A tubing coupling system comprising:
a length of corrugated tubing having a corrugated side wall defined by alternating, annular peak and valley portions and a cylindrical inner wall connected with an inner surface of the valley portions, annular chambers being defined between the cylindrical inner liner and each peak portion;
a bell having:
an open end into which the corrugated tubing length is received,
a generally cylindrical side wall having a generally cylindrical interior surface,
a stop for limiting receipt of the tubing length into the bell,
an annular gasket receiving groove defined in and extending peripherally around the cylindrical interior surface, the gasket receiving groove being a first integer number of corrugation valley portions from the stop such that a gasket receiving valley portions is aligned with the gasket receiving groove, and
a plurality of radially inward projecting, latch elements disposed a second integer number of valley portions from the stop, the latch elements being disposed circumferentially around the cylindrical side wall, each latch element extending into one of the corrugated tubing valley portions and engaging a side wall thereof for transferring axial uncoupling forces from the first length of corrugated tubing to the bell cylindrical side wall, the second integer number being larger than the first integer number.

13. The tubing coupling system as set forth in claim 12 further comprising a gasket received in the gasket receiving corrugation valley portion adjacent an end of the corrugated tubing length, the gasket having an outward projecting flange, the flange being resiliently biased to project outward beyond an outer diameter of the peak portions and an inner diameter of the bell cylindrical wall, the flange portion being compressible into the gasket receiving groove as the corrugated tubing length is received into the bell, such that the gasket resists axial decoupling.

14. The tubing coupling system as set forth in claim 12 wherein the latch elements and the bell cylindrical side wall are integrally constructed of plastic, the plastic defining a resilient hinge at an interface between each latch element and the bell cylindrical wall and further including a cut extending from the hinge, around the latch element, and back to the hinge.

15. The tubing coupling system as set forth in claim 14 wherein the latch elements each include:
   a cam surface which engages peak portions of the received tubing length and is cammed radially outward thereby; and
   a corrugation engaging wall which is received in a corrugation valley portion and engages an adjacent side wall to lock the length of corrugated tubing length against withdrawal.

16. The tubing coupling system as set forth in claim 14 wherein a tab portion is defined between each cut and latch element opposite to the hinge.

17. Coupling system comprising:
   a first length of corrugated tubing having a corrugated side wall defined by alternating, annular peak and valley portions and a cylindrical inner wall connected with an inner surface of the valley portions, annular chambers being defined between the cylindrical inner liner and each peak portion;
   a second length of corrugated tubing having a corrugated side wall defined by alternating, annular peak and valley portions and a cylindrical inner wall connected with an inner surface of the valley portions, annular chambers being defined between the cylindrical inner wall and each peak portion;
   a bell welded to peak portions of the second tubing length adjacent an end thereof, the bell having an open end into which the first corrugated tubing length is received and a generally cylindrical side wall having a generally cylindrical interior surface, the cylindrical side wall defining an annular gasket receiving groove peripherally around the cylindrical interior surface, and radially inward extending latch elements circumferentially therearound, each latch element extending into one of the first corrugated tubing valley portions and engaging a side wall thereof for transferring axial uncoupling forces from the first length of corrugated tubing to the bell cylindrical side wall, the latch elements axially spaced from said gasket receiving groove and being closer to the bell open end than the gasket receiving groove.

* * * * *